United States Patent [19]

Summers et al.

[11] 4,031,598

[45] June 28, 1977

[54] END-FORMING MACHINE FOR FLUORESCENT LAMP TUBES

[75] Inventors: William J. Summers, Montclair; William F. Betz, Livingston, both of N.J.

[73] Assignee: Westinghouse Electric Corporation, Pittsburgh, Pa.

[22] Filed: Sept. 16, 1976

[21] Appl. No.: 723,673

[52] U.S. Cl. .................................. 29/25.19; 65/279
[51] Int. Cl.² ............................................ H01J 9/46
[58] Field of Search .................. 29/25.19, 35.5, 36; 65/278, 279, 299; 408/45

[56] References Cited
UNITED STATES PATENTS

| 2,192,436 | 3/1940 | Groene et al. | 29/36 |
| 2,575,746 | 11/1951 | Cartun | 65/279 X |

*Primary Examiner*—Richard B. Lazarus
*Attorney, Agent, or Firm*—B. R. Studebaker

[57] ABSTRACT

An improved end-forming machine for fluorescent lamp tubes which employs a single main splined shaft to drive both indexing units in unison while having the facility to accommodate all standard commercial glass lamp tubes which may vary in length from 96 inches to 14 inches. Additionally, the tooling for each indexing turret is always maintained in the same relationship with its associated turret for all turret spacings.

8 Claims, 6 Drawing Figures

END-FORMING MACHINE FOR FLUORESCENT LAMP TUBES

BACKGROUND OF THE INVENTION

In the production of a fluorescent lamp the conventional manner for producing the elongated tubular glass envelopes in finished form so that they can proceed to the phosphor coating stage of the production process, involves first pulling from a glass furnace a long continuous glass tube which may extend for several hundred feet until it is cool enough to be processed. This elongated glass tube is cut in lengths which are slightly oversized with respect to the final lamp length and are dropped onto a conveyor belt which carries them in parallel relationship and on which they are cut to their final length. These parallel moving glass tubes are then picked up individually adjacent each end by an end-forming machine which includes a pair of spaced indexing turrets which move the glass tubes through six work stations which reciprocate onto each end of the tube as it indexes through the end-forming machine. The first five work stations are merely heating fires which soften the glass, with the sixth being an end-forming die which reciprocates in and closes to neck down each end of the glass tube simultaneously. At the next index of the indexing turrets the glass bulbs are released onto a second parallel conveyor where they move to a boxing station at which point they are placed in boxes for storage until they are to be manufactured into completed fluorescent lamps.

End-forming machines in the past have included a pair of spaced indexing turrets which carried the glass tubes through the end-forming operations as hereinbefore described. These spaced indexing turrets were fixed to a single shaft which interconnected the two turrets at the centers thereof. This central shaft also carried thereon the forming tools in the form of the gas fires and the forming die. When it was desired to change the length of tube being operated upon by the end-forming machine, it was necessary to shut the machine down, unbolt one of the indexing turrets and its associated tooling from the shaft, move these parts along the shaft to the new position which would accommodate the new length of tubing which was to have its ends formed and then the indexing turret and its associated tooling would have to be resecured to the rotating shaft. Many times, the machine would be down for several hours while precise alignment between the two indexing turrets was achieved because of the criticality of the relationship between the two turrets which generally index at a rate of about 90 indexes per minute. Many problems evolve from improper alignment such as the inability of the two turrets to simultaneously pick up each end of the glass tube as well as the problem of torque being applied at opposite ends of the thin walled glass tubing. With separately movable tooling the tooling had to be also remounted to the shaft at a position which left it identically spaced with respect to the turret as it was when the previous sized tubing was being end-formed.

SUMMARY OF THE INVENTION

Many of the obvious disadvantages of the prior art end-forming machines have been obviated by the improved end-forming machine of the present invention. By employing completely separate drive means for each of the turrets as well as its associated tooling and by having each of these separate and distinct driving mechanisms being driven by a single source of power, a machine is provided in which one of the tube carrying turrets, and associated fires and forming die can be moved independently. Because of the complete independence of the driving mechanism for one of the turrets and associated tooling, that side of the end-forming machine can be mounted on the machine base for relative movement therewith and selected positioning with respect thereto. A separate drive mechanism can also be provided to move this movable side of the machine to any preselected distance from the opposite fixed indexing turret and associated equipment and thereby accommodate a wide range of tube lengths.

The foregoing is accomplished in accordance with the present invention by providing an end-forming machine which includes a machine base, a headstock fixed to the machine base which includes a rotatably indexable lamp tube carrying turret, reciprocating heating and forming tools and operating means for operating the turret and heating and forming tools in sequence. Also mounted on the machine base for relative movement therewith and selective positioning with respect thereto, is a tailstock which is identical in structure and operation to the headstock. A locating drive means is associated with the tailstock for selectively positioning the tailstock on the machine base at several preselected distances from the headstock. A single drive shaft extends for substantially the length of the machine base and means are provided to couple each of the headstock and tailstock operating means to the single drive shaft which is driven by a single separate and distinct driving means. In the preferred form of this invention, the single drive shaft includes at least in part a splined shaft and the means coupling the tailstock to the single drive shaft coacts with the splined portion thereof.

BRIEF DESCRIPTION OF THE DRAWING

Many of the attendant advantages of the present invention will become more readily apparent and better understood as the following detailed description is considered in connection with the accompanying drawing, in which.

DESCRIPTION OF THE PREFERRED EMBODIMENT

Figure 1:
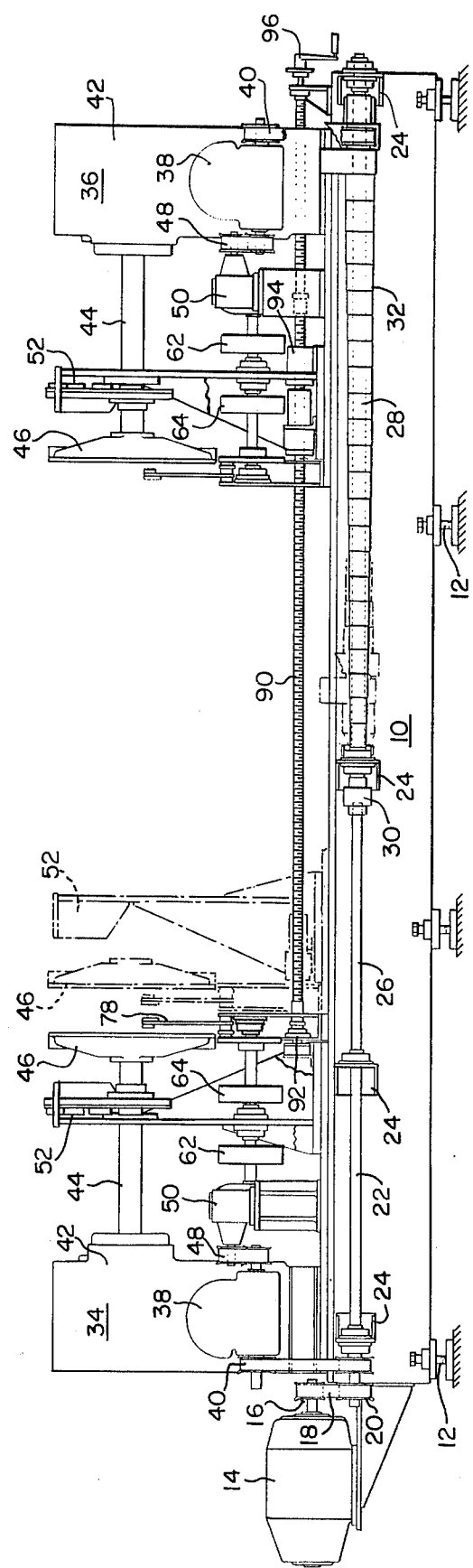
FIG. 1 is a front elevational view of the end-forming machine of the present invention.
Figure 2:
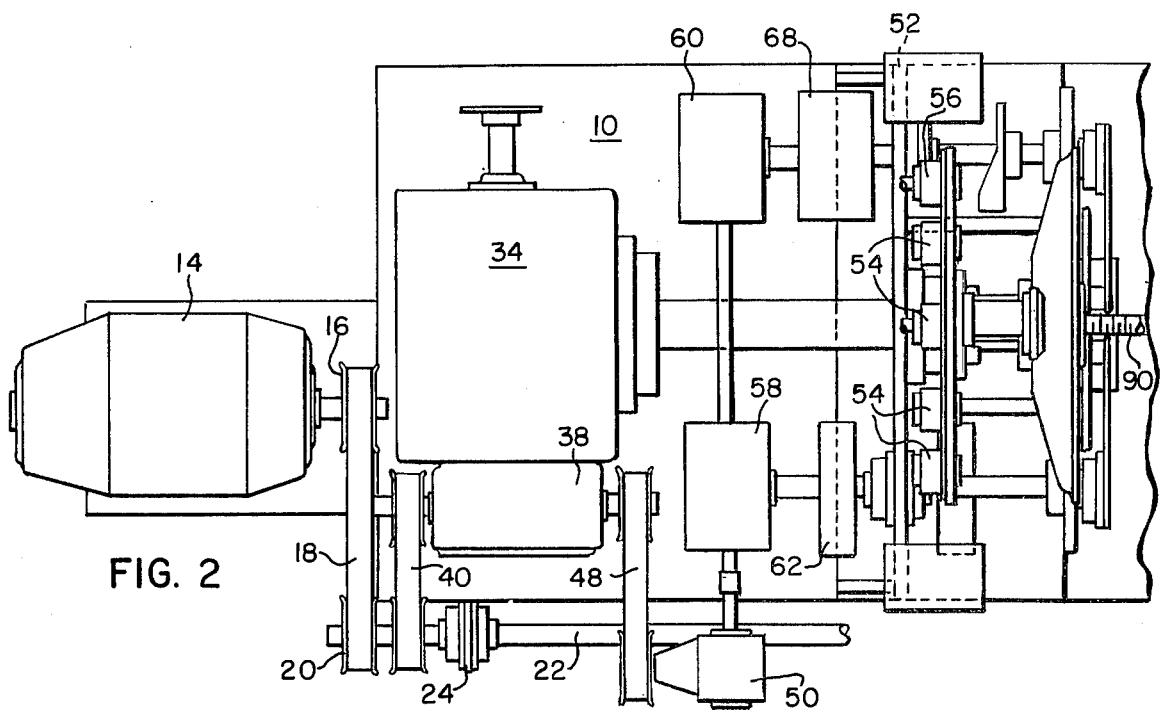
FIG. 2 is a top plan view of the left-hand end of the machine of FIG. 1.

Referring now in detail to the drawing, wherein like reference characters represent like parts throughout these several views, there is illustrated in FIG. 1 a front elevational view of the entire end-formng machine of the present invention. The machine includes a base 10 which is secured to the factory floor by means of a plurality of heavy bolts 12. All of the operating power for each side of the end-forming machine is provided by a single motor 14 which drives pulley 16 which in turn through a belt 18 drives a pulley 20 connected to a two part, single drive shaft 22, which provides the power to each of the operating units at each side of the end-forming machine.

The shaft 22 is mounted along the front end of the machine through a plurality of mounting members 24 which include bearings and permit the shaft to rotate therein. The shaft 22 includes a first half which is merely a straight shaft portion 26 which is coupled to a second part in the form of a splined shaft portion 28 by a coupling 30. The splined shaft portion 28 is surrounded by a telescoping cover 32 which prevents dirt, pieces of broken glass or other foreign matter from interfering with the operation of this splined shaft.

Each end portion identified generally as headstock portion 34 and the tailstock portion generally designated 36 is a substantially identical mirror image of each other and the respective parts thereof will be identified with identical reference characters with the exception of that portion of the tailstock which permits it to be relatively moved and selectively positioned with respect to the machine base 10 and the headstock 34. Power is provided from the main driving shaft 22 to a reducing gear box 38 through belt and pulley systems 40 at each side of the machine base.

The operation of the indexing turret at each side of the machine base is essentially conventional to standard end-forming machines in that the reducing gear boxes 38 are directly connected to a Ferguson indexing machine 42, which through indexing drive shafts 44, operate the indexing turrets 46. A pulley and belt system 48 connected to the output shaft of the gear box connects to second gear boxes 50, which in turn through a series of cone drive gear boxes and roll cams operate the burners and the end-forming die which are moved forward to their working positions between each index of the indexing turrets 46 in a conventional and well known manner. The tooling in the form of the burners and the end rollers are mounted on frames 52.

During the process of end-forming there are five work stations at which the burners 54 are moved in to surround the ends of the tube to provide for sufficient softening of the glass in order that, at the sixth work station, the roll forming die can be moved in to neck down the ends of the glass tube. The various gas lines and detailed parts which provide for fuel to the burners and operation of the work stations have been eliminated from the drawing for purposes of clarity since the operation of these devices is well known to those of ordinary skill in the art. Broadly, the output shaft of the angle gear boxes 50 operates to drive cone drive gear boxes 58 and 60 which in turn operate through rotating cams 62, 64 and 68 to move the tools into position and operate the forming roller.

Figure 3:
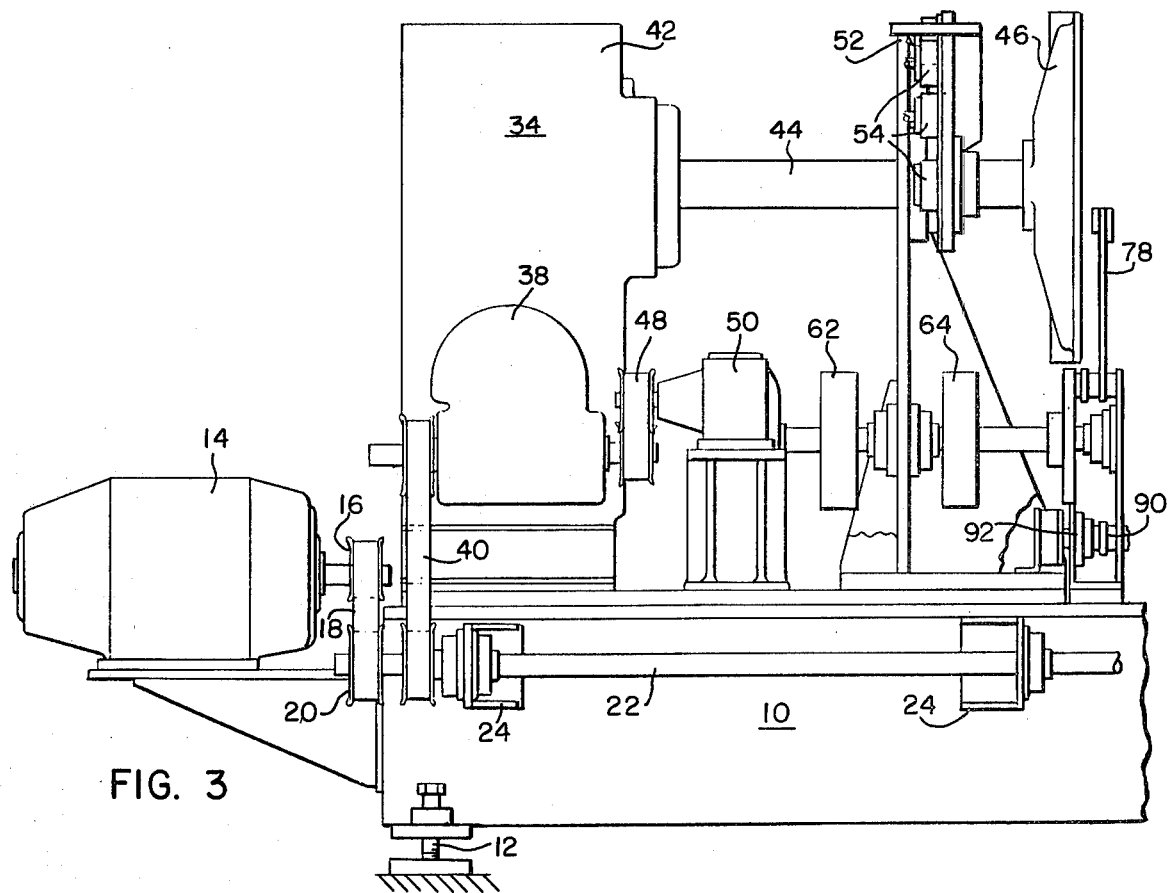
FIG. 3 is a front elevational view of the left-hand portion of the machine of FIG. 1.
Figure 4:
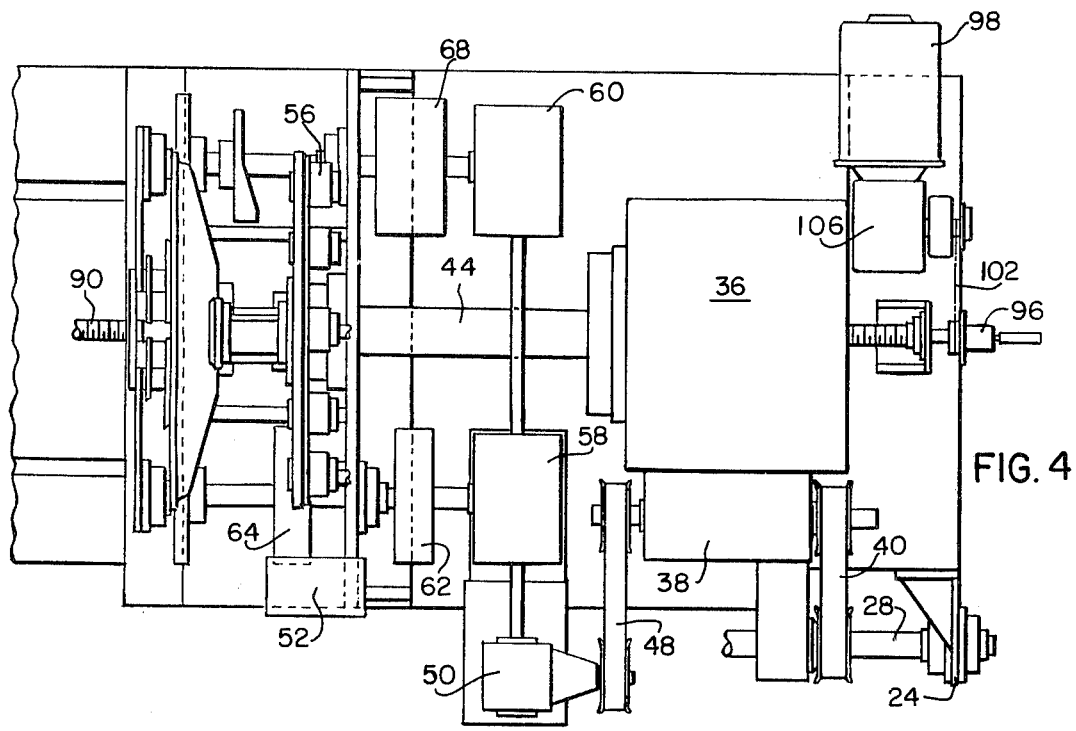
FIG. 4 is a top plan view of the left-hand portion thereof.
Figure 5:
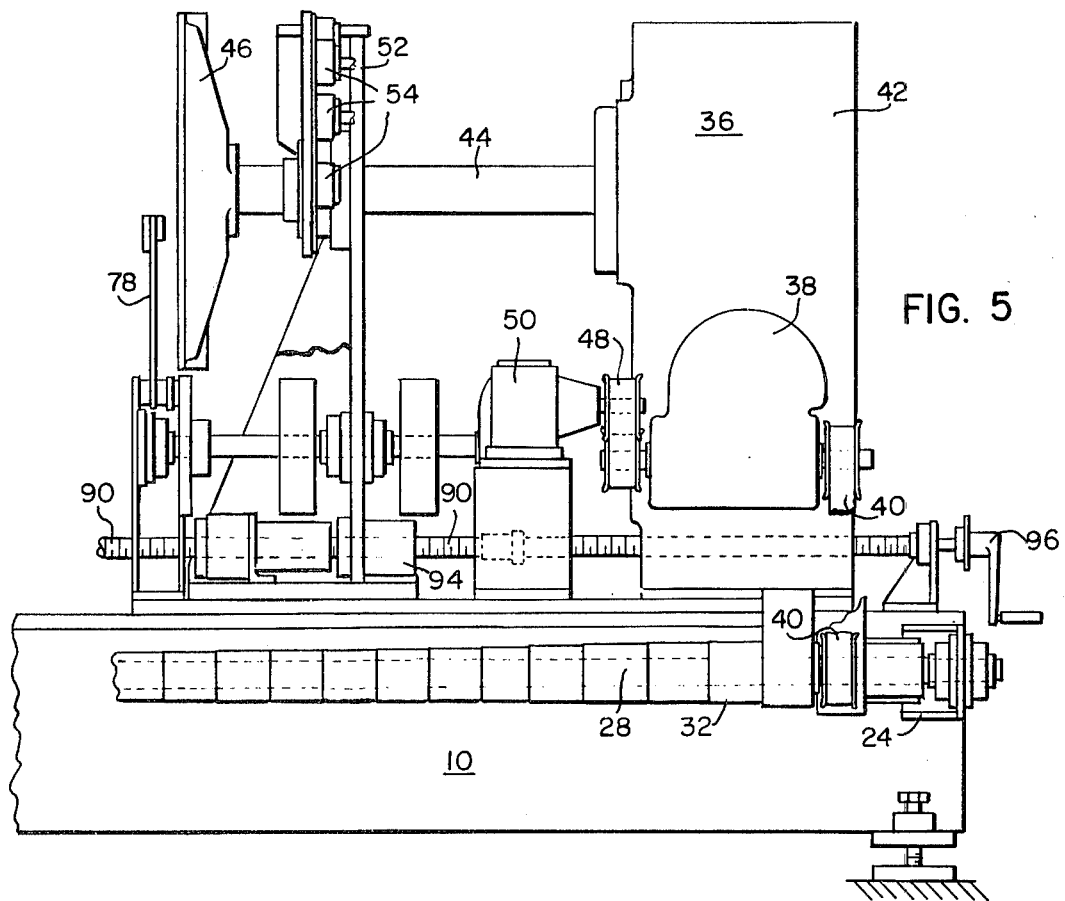
FIG. 5 is a front elevational view of the left-hand portion thereof.
Figure 6:
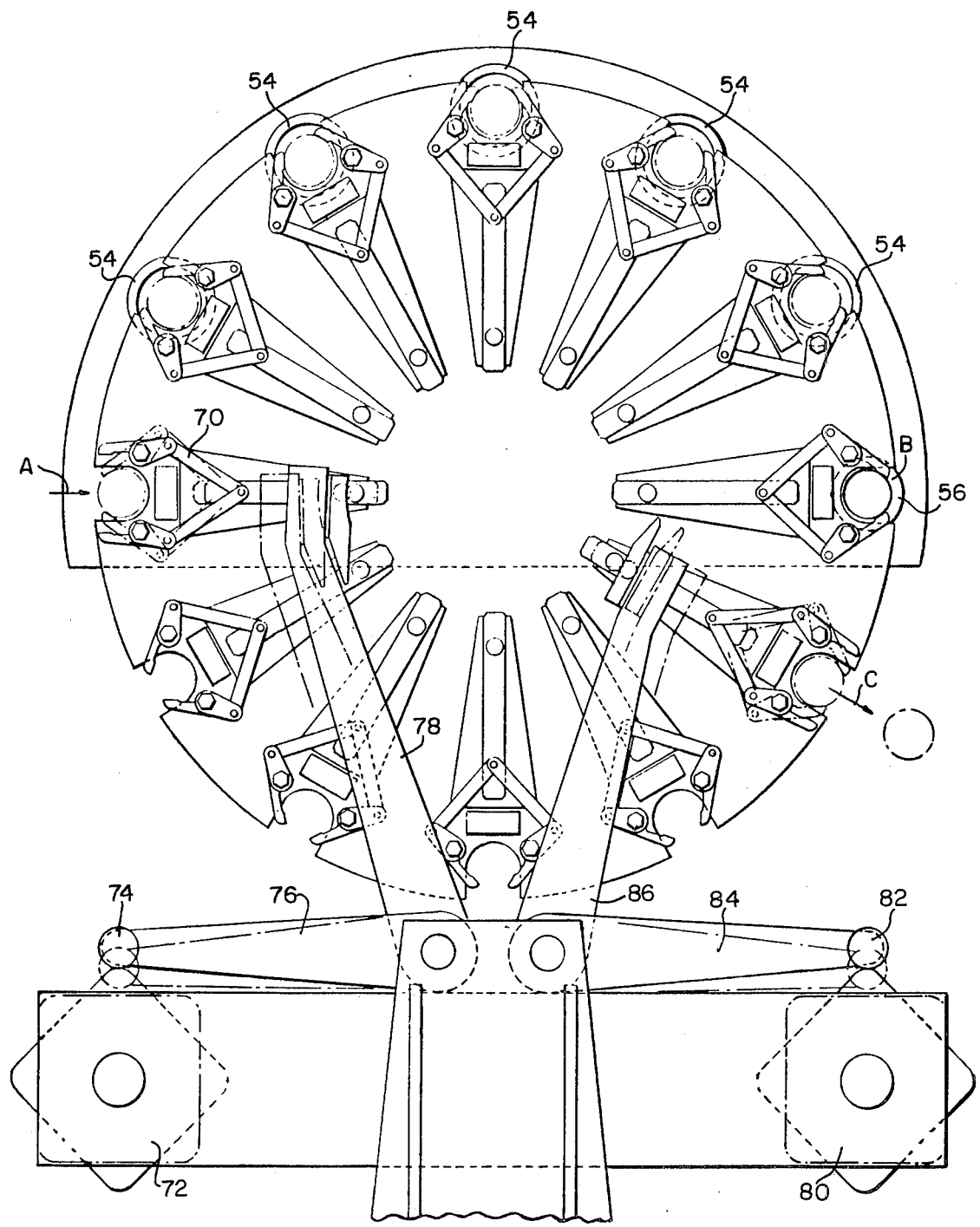
FIG. 6 is a front plan view of the indexing turret employed at either side of the end-forming machine of this invention.

Referring now to FIG. 6, there is illustrated the conventional tube carrying jaws which are mounted on the face of each of the turrets 46. The turret 46 on the left-hand side of FIG. 1, or more particularly, the tailstock end 34 as seen in FIG. 3, is illustrated in FIG. 6. The operation of the turret 46 on the tailstock side is a mirror image of the turret 46 on the headstock side.

As the tubes which have been cut to size move along the parallel conveyor, a tube is presented to a gripping jaw 70 which is in the position illustrated at the arrow A. When each of the gripper jaws 70 reach this position, the jaws are opened by means of a rotating cam 72 coacting with a cam roller 74 and lever arms 76 and 78.

In position A the gripper jaws are opened, receive a fluorescent tube and are closed through the action of the rotating cam 72 and the lever arms 76 and 78. At the next index, the lamp is moved to the next position clockwise in FIG. 6 where the first of the burners 54 heats the end of the tube. The lamp them proceeds through four subsequent burner positions during indexing of the lamp tube clockwise. At position B, after the ends of the tube have been sufficiently heated and softened, the forming dies 56 act on the ends of the tube to provide the neck configuration required for a fluorescent lamp. At position C the gripper jaws are again opened through operation of a second rotating cam 80, cam roller 82 and lever arms 84 and 86. The turrets 46 index at a rate of about 90 indexes per minute and during the time between each indexing step the tooling moves in to perform its function on each end of the ube simultaneously and the tooling is then retracted just prior to the next indexing of the turret which is conventional in most end-forming machines.

In the prior art end-forming machines when it was desired to change from one length tubing to another, because both turrets were run from a single central shaft, it was necessary to stop production for several hours while one of the turrets was unbolted from the shaft and moved to a different relationship with respect to the fixed turret and it was also necessary to move the tooling along that same shaft, which tooling had to be reset at the appropriate distance from the turret. In accordance with the present invention, these time consuming and difficult operations have been eliminated by providing for the tailstock 36 to be mounted to the machine base 10 on a sub-base 88 which is movable with respect to the main machine base 10. In this connection, the pulley of the pulley system 40 on the splined portion 28 of the main shaft 22 has a splined connection thereto which permits it to move along the splined portion 28 of that shaft. A threaded shaft 90 is mounted for rotation in a portion of the frame 52 of the headstock portion 34 as at 92 and extends through the tailstock portion 36 where it is coupled thereto by a threaded bushing 94 which coacts with the threaded shaft 90. As will be apparent, by operation of a crank 96 on the end of the shaft 90 the tailstock 36 can be variably positioned with respect to the headstock 34 and the base 10 at any position which will accommodate any size lamp tube of conventional manufacture.

A stepping motor 98 may also be provided which, through a gear box 100 and chain drive 102, can operate the positioning of the tailstock automatically if desired. A switching system can be preset so that the motor 98 through the chain drive 102 will operate to move the tailstock to preset programmed positions with respect to the headstock 34.

As illustrated in FIG. 1 in the full line position, the end-forming machine of this invention is shown in a position to accommodate glass tubes for the manufacture of a 96 inches slimline-type fluorescent lamp tube. In its dotted line position which is illustrated by only the turret 46 and frame 52, a position is illustrated which will accommodate a 14 watt fluorescent lamp which has an overall length of about 14 inches.

As will be apparent from the foregoing, there has been provided a new end-forming machine for fluorescent lamp tubes in which all of the operating power is derived from a single rotating shaft which has both the headstock and tailstock operations operated therefrom at opposite ends thereof. Additionally, there has been provided an improved endforming machine for fluorescent lamp tubes in which the tailstock along with its power equipment, indexing turret and tooling is selectively positionable with respect to the machine base as well as the headstock and its associated apparatus.

What is claimed is:

1. An improved end-forming machine for fluorescent lamp tubes, said end-forming machine comprising:
   an elongated machine base,
   a headstock affixed to said machine base, said headstock including a rotatably indexable lamp tube carrying turret, reciprocating heating and forming tools operable to neck down one end of said lamp tubes and operating means for operating said turret and said heating and forming tools in sequence,
   a tailstock including a rotatably indexable lamp tube carrying turret, reciprocating heating and forming tools operable to neck down the other end of said lamp tubes and operating means for operating said turret and said heating and forming tools in sequence, said tailstock being mounted to said machine base for relative movement therewith and selective positioning with respect thereto,
   locating drive means associated with said tailstock for selectively positioning said tailstock along the length of said machine base a preselected distance from said headstock whereby lamp tubes of different lengths can be accommodated between the headstock and tailstock,
   single drive shaft means extending for substantially the length of said machine base,
   drive means for driving said single drive shaft means at a preselected speed, and
   means coupling each of said headstock and tailstock operating means to said single drive shaft means.

2. An improved end-forming machine for fluorescent lamp tubes according to claim 1 wherein said single drive shaft means is in part a splined shaft and said means coupling said tailstock to said single drive shaft means coacts with the splined portion thereof.

3. An improved end-forming machine for fluorescent lamp tubes according to claim 1 wherein said means coupling each of said headstock and tailstock operating means to said single drive shaft means are separate belt and pulley systems.

4. An improved end-forming machine for fluorescent lamp tubes according to claim 1 wherein said locating drive means associated with said tailstock includes an elongated threaded shaft secured for rotation in said headstock and extending through said tailstock and a complementary threaded bushing in said tailstock cooperating with said threaded shaft, said tailstock being movable with respect to said machine base in response to rotation of said threaded shaft.

5. An improved end-forming machine for fluorescent lamp tubes, said end-forming machine comprising:
   an elongated machine base,
   a headstock affixed to said machine base, said headstock including a rotatably indexable lamp tube carrying turret, reciprocating tooling operable to neck down one end of said lamp tubes and operating means for operating said turret and said tooling in sequence, said tailstock being mounted to said machine base for relative movement therewith and selective positioning with respect thereto,
   locating drive means associated with said tailstock for selectively positioning said tailstock along the length of said machine base a preselected distance from said headstock whereby lamp tubes of different lengths can be accommodated between the headstock and tailstock, drive shaft means extending for substantially the length of said machine base,
   drive means for driving said drive shaft means, and
   means coupling each of said headstock and tailstock operating means to said drive shaft means.

6. An improved end-forming machine for fluorescent lamp tubes according to claim 5 wherein said drive shaft means is in part a splined shaft and said means coupling said tailstock to said drive shaft means is coupled to the splined portion thereof.

7. An improved end-forming machine for fluorescent lamp tubes according to claim 5 wherein said means coupling each of said headstock and tailstock operating means to said drive shaft means are separate belt and pulley systems.

8. An improved end-forming machine for fluorescent lamp tubes according to claim 5 wherein said locating drive means associated with said tailstock includes an elongated threaded shaft secured for rotation in said headstock and extending through said tailstock and a complementary threaded bushing in said tailstock cooperating with said threaded shaft, said tailstock being movable with respect to said machine base in response to rotation of said threaded shaft.

* * * * *